March 31, 1970  V. HAENSEL  3,503,715
APPARATUS FOR TREATING AN EXHAUST GAS STREAM WITH
DIFFERENT CATALYST BEDS
Filed April 5, 1968
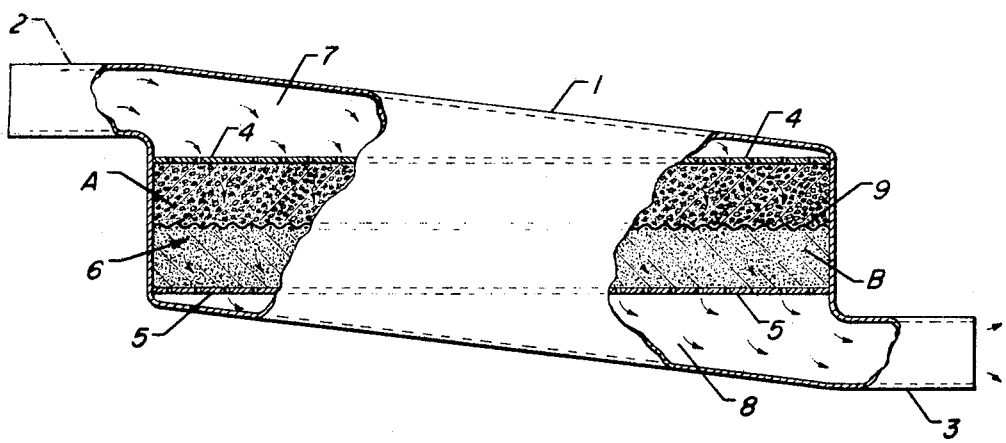
INVENTOR:
Vladimir Haensel
BY:
*James R. Hoatson Jr.*
*Philip T. Liggett*
ATTORNEYS

United States Patent Office 3,503,715
Patented Mar. 31, 1970

3,503,715
APPARATUS FOR TREATING AN EXHAUST GAS STREAM WITH DIFFERENT CATALYST BEDS
Vladimir Haensel, Hinsdale, Ill., assignor to Universal Oil Products Company, Des Plaines, Ill., a corporation of Delaware
Continuation-in-part of application Ser. No. 302,794, Aug. 19, 1963. This application Apr. 5, 1968, Ser. No. 733,200
Int. Cl. F01m *3/14;* B01d *53/34;* B01j *9/04*
U.S. Cl. 23—288                                   5 Claims

ABSTRACT OF THE DISCLOSURE

A unitary apparatus for effecting the catalytic oxidation of engine exhaust gases, where there may be both high and low quantities of hydrocarbon emissions with such gases, with one catalyst layer comprising platinized alumina particles and a next adjacent layer comprising platinized alumina particles containing a barium, calcium or strontium component.

---

This application is a continuation-in-part of my earlier filed patent application Ser. No. 302,794, filed Aug. 19, 1963, now abandoned.

The present invention relates to means for effecting the treatment of an exhaust gas stream with specially prepared arrangements of catalyst beds and more particularly to effecting the oxidation of engine exhaust gases with subdivided catalyst particles comprising at least two different forms of platinum activation.

The desirability and importance of removing certain components from automobile exhaust gases has recently been recognized. The unavoidable incomplete combustion of hydrocarbon fuels by the gasoline engine results in the generation of substantial quantities of unburned hydrocarbons and other undesirable products, which, as waste products, discharge into the atmosphere through the exhaust line. With the ever-increasing concentration of automobiles, particularly in urban areas, the discharge of deleterious matter into the atmosphere may reach significant proportions. These undesirable products are believed to react with atmospheric oxygen, under the influence of sunlight, to produce what is now commonly referred to as smog. The undesirable combustion products include, for example, unsaturated hydrocarbons, partially oxidized hydrocarbons, such as alcohols, ketones, aldehydes, and acids, etc., carbon monoxide and various oxides of nitrogen and sulfur.

The discharge of exhaust gases from automotive engines is only one source of pollution within the atmosphere. Although described with particular reference to the conversion of such exhaust gases, the present invention is equally well adaptable to utilization with diesel engines, butane engines, natural gas engines and the like. Other sources of atmospheric pollution include the waste material from stationary units such as large internal combustion engines for driving pumps, compressors, generators; flue gas power recovery units, exhaust fumes from various industrial operations such as the printing industry, the tanning industry and various chemical industries.

With regard to automotive and other vehicular applications, the catalyst is usually disposed as a fixed, particle-form bed placed in a suitable container or catalytic converter which is installed in the engine exhaust gas line. The catalytic converter may be of the through-flow, cross-flow or radial flow design and may supplant or be combined with the normal acoustic muffler. Secondary or combustion air is injected ahead of the converter inlet usually by means of an aspirator or by a suitable external compressor. The rate of secondary air flow is usually adjusted or maintained to provide from about 10% to about 30% of excess air so as to insure reasonably high conversion levels under all conditions of driving.

It has been found in connection with the study and testing of the conversion of engine exhaust gas streams that there are wide variations in the types of exhaust emissions from automobile engines. For example, new auto engines tend to release relatively low quantities of unburned hydrocarbons and carbon monoxide as compared with engines in older vehicles. As a result, there are engines which are designated as having low emission rates and engines with high emission rates, with the latter tending to give catalytic conversions in a confined converter-muffler which will reach relatively high temperature levels of the order of 1800° F., or higher, by virtue of the extensive catalytic oxidation taking place. In addition, there has been found that certain oxidation catalyst composites or special preparations of certain composites, have the activity and stability to provide good conversions for the high emission high temperature operations, while conversely certain catalyst preparations are not as well suited for the high temperature conditions, although they will give superior performance and good stability or life under normal low emission conditions.

It is therefore a principal object of the present invention to provide a specially prepared oxidation catalyst mixture or arrangement of different catalysts adapted for placement within a converter-muffler means and to accommodate both high and low emission engine operations.

It is also an object of the present invention to provide an oxidizing catalyst bed arrangement such that a specially prepared catalyst suitable for oxidizing low emission gas streams is used to initially contact the engine exhaust gases while a second stage specially prepared modified catalyst is combined with the first portion to take care of high temperature, high emission engine operations.

There are various types of catalytically active materials which may be utilized to advantage for effecting the catalytic oxidation of exhaust gas streams from low emission engines and it is not intended to unduly limit the present operation and catalyst mixture to the use of but one or two catalyst composites or percentage of activating components, particularly in connection with that portion of the bed or mixture adapted to effect the initial contacting of the exhaust gas stream, and at the same time having a high stability in the presence of low emission engine exhaust streams. Thus, for the purpose of the present invention, the term "active" as applied to a catalytic component for addition to a subdivided refractory base material, shall mean a component which has the ability to initiate and to effect catalytic oxidation at a relatively low temperature and maintain a high conversion of hydrocarbons and carbon monoxide in an exhaust gas stream for a sustained period of time. For example, an active component for a catalyst may comprise any of the following: platinum, palladium-iridium, osmium, ruthenium and rhodium, or iron, cobalt, nickel, copper, vanadium, tungsten, molybdenum or noble metals such as silver and gold, or various mixtures may be used including platinum-iron, platinum-cobalt, platinum-nickel, palladium-cobalt, palladium-nickel, platinum-palladium, platinum-copper-cobalt, platinum-copper-lithium-cobalt, palladium-cobalt-copper, platinum-copper-cobalt-nickel, platinum-palladium-cobalt, platinum-magnesium, platinum-cobalt-magnesium, platinum-cobalt-lithium, etc. As will be set forth in greater detail, such catalytically active components may be composited with a suitable refractory inorganic oxide carrier material such as aluminium oxide or an oxide of one or more of the following: zirconium, titanium, hafnium and silicon, or alternatively, such metal oxides compounded with aluminum oxide as the principal base component. Also, where desired halogen or phosphorus, or both, may be combined with the support to provide a further acidic constituent.

Test work has shown that platinum or a platinum group metal provides a preferred active component on low density alumina as refractory base material. In other words, as compared to other metals or metal oxide active components, it appears that a platinum containing composite provides greater conversions and longer life in actually converting engine exhaust gas streams under simulated driving conditions.

In addition to preferring platinum as an active oxidizing component for an exhaust gas stream conversion, it has been found in connection with associated test work that certain additive oxide components with the alumina, which may be added prior to or after impregnation with the platinum compound, will materially effect the performance and life of the resulting catalyst. For instance, as set forth briefly hereinbefore, the use of certain alkaline earth components such as calcium, strontium and barium, and particularly the latter material, will assist in providing a resulting composite of platinum-alumina-barium oxide which has a high degree of stability for high temperature conditions such as encountered when effecting the conversion of high emission exhaust gas streams. Preferably, the amount of barium oxide additive to the platinum-alumina composite shall be present in an amount greater than about 1% by weight thereof, up to the order of about 20% by weight thereof.

A broad embodiment of the present invention provides means for catalytically treating an exhaust gas stream to oxidize combustible components therein, which comprises, contacting said exhaust gas stream in admixture with air and at oxidizing conditions with a catalyst system having a first portion thereof comprising a refractory base material with a platinum group metal active catalytic oxidizing component and in addition having a second portion thereof comprising a refractory base material with a platinum group metal active catalytic component and an added alkaline earth component selected from the group consisting of calcium, strontium ad barium.

Other associated test work has found in connection with catalysts which are particularly suitable for normal or relatively low emission engine exhaust gas streams, an active and stable catalyst composite may comprise a platinum-alumina compound which has been prepared by impregnating low density alumina spheres with a platinum compound in the presence of a sulfur-containing compound, as for example, a sulfur containing carboxylic acid such as thiomalic acid. It appears that the impregnation being carried out in the presence of the sulfur containing organic acid effects a physical deposition of the active platinum layer along the extreme outer shell of the alumina spheres with little or no deep penetration. Treatment with a sulfur containing acid may also take place after conventional platinum impregnations, including those where the platinum is penetrated well below the surface. In any event, the resulting catalyst after treatment with the sulfur-containing acid compound, has relatively low temperature ignition characteristics and the ability to effect good conversions over a period of time as long as the exhaust gas stream does not reach high temperature ranges above about 1400° F. In view of this characteristic it is advantageous in effecting a physical mixture of different catalysts to utilize a catalyst for the initial contacting of the exhaust gas stream whereby rapid ignition in the converter-muffler can take place and whereby the resulting partially oxidized exhaust gas stream can subsequently pass into contact with additional catalyst particles having high temperature stability.

Thus, in still another embodiment, the present invention provides means for catalytically treating an exhaust gas stream to oxidize combustible components therein, which comprises, initially contacting said exhaust gas stream in admixture with air and at oxidizing conditions with a first portion of a catalyst comprising a refractory base material with a platinum group activating component which has been treated with a sulfur-containing carboxylic acid, and, secondly contacting said stream with an additional portion of catalyst comprising a refractory base material with a platinum group metal activating component and another component from the group of barium oxide, calcium oxide and strontium oxide.

It has also been determined by associated developments and test work that the presence of certain sulfur free organic acids during the impregnation of the alumina spheres with the platinum component will have an effect in maintaining the active platinum layer a finite distance below the surface of the sphere whereby there appears to be greater life or stability effecting the oxidation of engine exhaust gas streams at high temperature conditions. Various organic acids may be utilized and in general are selected from the group consisting of dibasic acids and derivatives thereof, having the following structural formula:

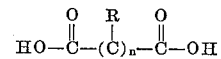

where:

R is selected from hydrogen hydroxyl and alkyl groups;
R' is selected from hydrogen, alkyl and carboxyl groups; and
$n$ is within the range of 0 to 6.

In accordance with the structural formula given above, suitable organic acids for use in preparing the catalytic composite of the present invention include, but not by way of limitation, oxalic, malonic, succinic, glutaric, adipic, pimelic, suberic, malic, tartaric, citric, 2-methyl succinic, 2,3-diethyl succinic, 2,2-dimethyl succinic, mixtures of two or more, etc. Thus, where platinum impregnation below the surface is desired, then suitable acids may comprise any of the foregoing, with citric acid comprising a preferred material, for use in combination with chloroplatinic acid to effect the impregnation on the low density spheres.

The refractory inorganic oxide carrier material, for utilization in the catalyst of the present invention may be manufactured by any suitable method, including separate, successive and co-precipitation means of manufacture, when comprising two or more individual inorganic oxides. The carrier material may also comprise naturally-occurring substances such as clays, or earths, and may or may not be activated prior to use by one or more treatments including drying, calcining, steaming or treatments with various reagents, etc. The catalyst composite of the present invention will, as previously noted, preferably make use of an alumina-containing refractory inorganic oxide carrier material. As employed herein, the term "alumina" is intended to include porous aluminum oxide in various states of hydration. In addition to alumina, other refractory inorganic oxides may be employed, either in conjunction with, or instead of, the alumina. Other suitable inorganic oxides include silica, boria, thoria, titania, zirconia, hafnia and mixtures of two or more. The incorporation of any of the foregoing refractory inorganic oxides, in conjunction with the alumina, is generally dependent upon the desire to add thereto certain physical and/or chemical characteristics required by the particular application for which the catalytic composite is intended. Such other refractory inorganic oxides, for example, silica, will be present within the carrier material in an amount within the range of about 0.5% to about 25.0% by weight thereof, based upon the final weight of the carrier. Intermediate quantities are preferred and will lie within the range of about 1.0% to about 10.0% by weight. The carrier material may take the form of any desired shape such as spheres, pills, extrudates, granules, cakes, briquettes, rings, etc. The preferred form is the low density sphere, and spheres may be continuously manufactured by the well-known oil-drop method: this method is described in detail in U.S. Patent No. 2,620,314 issued to James Hoekstra. In the interest of simplicity and clarity, the following discussion will be primarily directed to the use of alumina as the refractory inorganic oxide carrier material.

In connection with the portion of the mixed catalyst bed having the barium, calcium, or strontium component, various methods of impregnation may be used to impregnate the carrier material with such alkaline earth component. Generally, a water soluble compound of the particular component is used to soak the carrier or the activated composite so as to insure a bond of the component, as a resulting oxide with the carrier. Thus, the barium, strontium or calcium compound may be in the form of a hydroxide, a formate, a nitrate, etc., when used to impregnate the carrier or composite. Impregnation may be adequately accomplished in a one or two hour soaking, however, generally the soaking will be carried out for 4 to 20 hours or the like to provide optimum results. After the impregnation, the composite is subjected to drying by heating or the use of a rotary evaporator. It appears also that impregnation with the added component may be before or after impregnation with the active metallic catalytic component, although equivalent activity-stabilities, crushing strengths and lead resistances may not be obtained from the different methods of compositing.

Where desired, halogen may be obtained with the alumina and the catalytically active metallic components, and may be added thereto in any suitable manner either before or after the incorporation of the active metallic components. The addition of the halogen is generally accomplished through the use of an acid such as hydrogen fluoride and/or hydrogen chloride or volatile salt such as ammonium fluoride and/or ammonium chloride, and the halogen may be combined with the alumina during the preparation of the latter. In still another method of manufacture, the halogen may be composited with a refractory oxide during the impregnation thereof with the catalytically active metallic components. Thus, where the alumina is prepared from an alumina hydrosol having an aluminum to chloride weight ratio of about 1.3, the use of such method permits the incorporation of chloride where the latter is desired as the halogen component.

Regardless of the particular refractory inorganic oxide carrier material employed, the catalytically active metallic components may be added thereto in any suitable, convenient manner. With respect to platinum, suitable water-soluble compounds for utilization in the impregnating solution include chloroplatinic acid, chloroplatinous acid, platinous chloride, platinic chloride, etc. Where the catalytic composite is intended to contain other metallic components, such as those hereinbefore set forth, the composite may be prepared by commingling water-soluble compounds of these components, particularly the nitrates, sulfates, chlorates, chlorides, or carbonates, and immersing the particles of the carrier material therein, followed by heating to form the corresponding oxides of the metallic components.

The quantity of the catalytically active metallic components is used upon the volume of the carrier material to be combined therewith and is calculated on the basis of the elemental metal, notwithstanding that the metallic component may exist in some combined complex form, or in the elemental state. Thus, with respect to platinum group metals, the platinum will be present in an amount of from about 0.05 to about 2.0 troy ounces per cubic foot of carrier material, or within the range of from about .01% to about 1.0% of platinum, by weight of the composite. The preferred range of the concentration of the platinum component, dictated by economic considerations, is from about 0.15 to about 0.60 troy ounces per cubic foot of carrier material. The other metallic components, either in conjunction with, or instead of, the platinum component will be present in an amount of from about 0.01 to about 2.0 troy ounces per cubic foot of carrier material employed.

The following examples are given for the purpose of indicating the benefits to be afforded by the present invention, which invention utilizes a physical mixture of catalytic composites, one of which includes a composite having an additive alkaline earth component with a catalytic amount of an active metal component.

The various catalytic composites are evaluated by a test procedure which simulates actual driving conditions. The test procedure involves the utilization of a standard dynamometer, by which an eight-cylinder internal combustion engine is loaded by a motor generator. Approximately 440 cc. of each of the catalyst portions are individually evaluated by each being placed within a cylindrical vessel, or converter, having an inside diameter of about 4 inches, the entire apparatus being serially connected into the engine exhaust line. In each case, the catalyst sample is disposed within the converter on a supporting screen to a bed height of about 2 to about 3 inches. A second screen is placed above the catalyst bed for the purpose of separating the catalyst from the ¼-inch ceramic balls employed to facilitate the even distribution of the exhaust gases flowing downwardly through the apparatus. Four such catalyst-loaded converters are utilized in parallel in a given test period; this practice permits the simultaneous testing of different catalysts and provides an excellent basis for making a comparative study of the results.

Combustion air is pressured into the converter inlet, the flow rate being adjusted such that the average temperature of the catalyst bed is maintained at a level within the range of about 800° F. to about 1700° F. It is preferred that the flow rate of combustion air be held constant at about six pounds per hour, such that the catalyst bed average temperature is maintained at a level of about 950° F. The fuel employed in the test procedure is a blend of catalytically reformed gasoline (40.0%), catalytically cracked gasoline (40.0%) and alkylate (20.0%) and contains 3.0 milliliters of tetraethyl lead per gallon. Since the concentration of unburned hydrocarbons, and other noxious products, within the exhaust gases, as well as the throughput thereof, varies in accordance with the physical status of the engine, whether idling, accelerating, cruising or decelerating, the test procedure still further approximates actual road conditions by providing for a constant load throughout only a portion of the entire test period. Samples of the converter inlet and outlet gases are taken at various intervals during the test procedure, there being a constant analysis for the concentration of carbon monoxide. The samples are analyzed for hydrocarbons by a flame-ionization detector. The term "hydrocarbon," as utilized in reporting the results of the anaylses performed on the effluent gases from the catalytic converter, connotes all hydrocarbons whether saturated, unsaturated, or partially oxidized as hereinbefore set forth. The carbon monoxide concentration within the exhaust gases is determined by an accurate infra-red detector. The internal combustion engine is operated in a particular cycle to simulate idling, accelerating, cruising and decelerating as experienced under actual road conditions. During the entire test procedure, which usually covers a period of about 32 to 40 hours, about 300 gallons of the aforementioned fuel is employed. The 40-hour test period is divided into eight five-hour cycles; each five-hour cycle consists of a four and one-half hour cruise at a contsant 2500 r.p.m. and 41 B.H.P., and a one-half hour cycle consisting of a series of 15 two-minute cycles comprising idling at 750 r.p.m., accelerating to cruise at 2000 r.p.m., and a deceleration to idling at 750 r.p.m.

An inherent result of the small volume of catalyst employed in the test evaluation procedure is that the space velocity of the exhaust gases coming into contact with the catalyst is considerably higher than would be encountered under actual driving conditions. Accordingly, the percentage conversion obtained during actual use in automotive exhaust gas converters would be considerably higher.

EXAMPLE I

⅛-inch alumina spheres were impregnated with a sufficient quantity of chloroplatinic acid (having a concentration of 0.0628 gram of platinum milliliter) to yield a catalyst containing 0.32 troy ounces of platinum, calculated as the element thereof, per cubic foot of alumina. For 150 grams of alumina sphers the required quantity of chloroplatinic acid was diluted to 500 milliliters with water and then used for the impregnation step. Subsequently the spheres were evaporated to dryness in a rotating drier at a temperature of about 210° F. Then, while increasing the temperature to a level of about 1000° F., the catalyst was subjected to an atmosphere of hydrogen; after reaching a temperature level of 1000° F., the hydrogen treatment was continued at that temperature for a period of about two hours. The catalyst was allowed to cool in the reducing zone prior to being exposed to the atmosphere.

Upon testing the catalyst in accordance with the procedure previously outlined it was found that this catalyst provided an initial hydrocarbon conversion of 79.8% and at the end of 40 hours a conversion of 52.1%. The carbon monoxide conversion was initially 94.7% and after 40 hours 73.8%.

EXAMPLE II

Alumina spheres were impregnated with chloro-platinic acid as described in Example I. The resulting platinum-alumina spheres were then treated with a barium hydroide solution containing 10% barium oxide by weight of the composite for an overnight period and then washed, dried and calcined at 100° F. to provide a resulting platinum-alumina-barium oxide composite.

Upon testing the catalyst provided an initial hydrocarbon conversion of 54.5% and at the end of 32 hours a conversion of 41%. The carbon monoxide conversion was initially 85.5% and at the end of 32 hours 72%.

EXAMPLE III

In this example another batch of spheres was prepared in the same manner as that set forth in Example II.

Upon testing, it was found that the initial hydrocarbon conversion was 58% and after 32 hours 40%. The carbon monoxide conversion was initially 90% and after 32 hours 71%.

EXAMPLE IV

The alumina spheres were impregnated with chloro-platinic acid and thiomalic acid. where the latter is in approximately a 3 to 1 molar ratio to platinum and yielding 0.32 troy ounces of platinum calculated as the aluminum thereof per cubic foot of alumina. Resulting catalytically activated composite was then dried and reduced in the presence of hydrogen for an approximate two hour period at a temperature of about 1000° F.

Upon testing, the catalyst was found to provide an initial hydrocarbon conversion of 73% and at the end of 32 hours a conversion of 63%. Also, at the end of a 62 hour period the conversion was 54%. The initial carbon monoxide conversion was 95% and at the end of 32 hours 85% while at the end of 62 hours the conversion was 76%.

EXAMPLE V

Alumina spheres were impregnated with chloroplatinic acid in the presence of a 3 to 1 molar ratio of thiomalic acid in a manner similar to that set forth in the preceding example. Then in addition the spheres were subjected to an overnight soaking in the presence of a 10% barium oxide solution. The barium oxide soaked spheres were dried and calcined at 1000° F.

Upon testing, the catalyst was found to provide an initial hydrocarbon conversion of 68% and at the end of 32 hours a conversion of 53% while at the end of a 62 hour period the conversion was 38%. The carbon monoxide conversion was initially 96%, at the end of 32 hours the conversion was 77% while at the end of 62 hours the conversion was 60%.

EXAMPLE VI

The catalyst of this example was prepared in a manner similar to that set forth in Example IV.

Upon testing the catalyst was found to provide an initial hydrocarbon conversion of 59% and at the end of 32 hours a conversion of 55.5%. The initial carbon monoxide conversion was 84.5%, while at the end of 32 hours a conversion of 81.5%.

EXAMPLE VII

The catalyst of this example was prepared in the same manner as that set forth in Example V.

Upon testing, the initial hydrocarbon conversion was found to be 66% and at the end of 32 hours a conversion of 45%. The carbon monoxide conversion was initially 98% and at the end of 32 hours 68%.

EXAMPLE VIII

The alumina spheres of this example were impregnated with chloroplatinic acid in the presence of citric acid, where the latter was present in an approximate 3 to 1 molar ratio of platinum to acid and yielding 0.32 troy ounces of platinum per cubic foot of alumina. The resulting catalytically activated composite was dried and reduced in the presence of hydrogen for an approximate two hour period at about 1000° F. Subsequent to the reduction step, the catalyst was subjected to a high temperature calcination of 1800° F. in the presence of air.

Upon testing, the initial hydrocarbon conversion was found to be 59.5% and at the end of 40 hours 32.8%. The carbon monoxide conversion was initially 72.6% and at the end of 40 hours 50.9%.

EXAMPLE IX

The alumina-platinum composite in this example was prepared in a manner similar to that set forth in the previous example using chloroplatinic acid in the presence of citric acid. However subsequently the composite was soaked overnight with a 10% barium oxide solution. The soaked composite was then reduced at 1000° F. in the presence of hydrogen. Following the foregoing preparation the catalyst composite was calcined in air at 1800° F.

Upon testing, the initial hydrocarbon conversion was found to be 65.7% and at the end of 40 hours the conversion was 61.6%. The carbon monoxide conversion was initially 72.9% and at the end of 40 hours 69.3%.

EXAMPLE X

The alumina-platinum composite in this example was prepared in a manner similar to that set forth in the previous example using chloroplatinic acid in the presence of citric acid. However, subsequently the composite was soaked overnight with a 10% calcium oxide solution. The soaked composite was then reduced at 1000° F. in the presence of hydrogen. Following the foregoing preparation the catalyst composite was calcined in air at 1800° F.

Upon testing the initial hydrocarbon conversion was found to be 62.2% and at the end of 40 hours, the conversion was 47.4%. The carbon monoxide conversion was initially 66.2% and at the end of 40 hours 57.4%.

EXAMPLE XI

The alumina-platinum composite in this example was prepared in a manner similar to that set forth in the previous example using chloroplatinic acid in the presence of citric acid. However, subsequently the composite was soaked overnight with a 10% strontium oxide solution. The soaked composite was then reduced at 1000° F. in the presence of hydrogen. Following the foregoing preparation the catalyst composite was calcined in air at 1800° F.

Upon testing the initial hydrocarbon conversion was found to be 66.5% and at the end of the 40 hours, the conversion was 43.8%. The carbon monoxide conversion was initially 72.9% and at the end of 40 hours 59.5%.

For convenience the test results of the catalyst composites described in the foregoing examples are set forth in the accompanying Table I.

In connection with the test results for the first three examples, and having in mind that the test engine utilized in connection with the foregoing test runs has a generally low emission rate, it will be noted that the catalyst without barium appeared to have high initial activity for both hydrocarbons and carbon monoxide conversion, as well as better stability at the end of the given sustained period of operation. A similar comparison may be noted in connection with the Examples IV, V, VI and VII, with the non-barium containing catalysts of Examples IV and VI appearing to have the greater activity and stability in connection with exhaust gas stream treating from a low emission engine.

A comparison of the results of Examples VIII and IX indicates the reverse findings, with the barium containing catalyst providing greater activity and stability as compared with the non-barium containing catalyst where the composite has been subjected to high temperature treatment at 1800° F. to simulate exposure similar to that which will be encountered in receiving gases from a high emission engine. Such engines give off quantities of hydrocarbons and carbon monoxide to in turn result in periodic high temperature conversion conditions.

A comparison of the last three examples shows that each of the catalysts with an alkaline earth component provided greater stability than the platinum-alumina catalyst alone for the high temperature treatment. However, in addition, the comparison of the last three examples indicates that the barium provides greater activity and stability than calcium or strontium and is thus the preferred additive.

It may be further pointed out that an X-ray analysis of the physical characteristics of used catalyst composites found, in all instances, that the alumina of the non-barium containing catalysts was converted from the gamma form to the theta form. In contrast, it was found in all of the analyses of the catalyst composites containing barium, that the alumina was substantially unconverted, there being little or no conversion from the gamma to the theta form. Thus, it is quite apparent that the barium addition precluded conversion of the alumina and was highly useful in maintaining activity and stability for the conversion of high temperature test streams such as will be encountered in connection with high emission automobile engines.

Reference to the accompanying drawing and the following description thereof will serve to describe briefly one proposed embodiment of the physical mixture of two different catalyst composites, in accordance with the present invention, with one portion containing barium and one portion being barium free.

Referring now to the drawing, there is shown an enclosed converter-muffler chamber 1 having an inlet port 2 and outlet port 3. The internal portion of chamber 1 is provided with an upper screen or perforate member 4 spaced from a lower screen or perforate member 5. The spaced perforate members 4 and 5 provide a catalyst retaining section 6 therebetween, as well as define an inlet manifold section 7 which connects to inlet port 2, while partitioning member 5 defines in combination with outlet 3 an outlet manifold section 8.

In accordance with the present invention, a physical mixture or arrangement of two different portions of catalyst composites are maintained within the catalyst section 6 such that any given exhaust gas stream passing through the converter-muffler must contact each of the types of catalyst. There is diagrammatically indicated an upper portion of catalyst A which is adapted to accommodate a lower temperature, low emission engine exhaust gases and effect a high degree of conversion. Downstream from the catalyst portion A is a second stage catalyst portion B which contains barium oxide, or other suitable alkaline earth component adapted to give high temperature resistance and stability thereto. Such portion is thus particularly adaptable for use in contacting high temperature exhaust gas streams from high emission engines. The unitary device, as shown, is thus capable of handling exhaust gases from any kind of vehicle engine, or from an engine which may change from being a low emission engine to a high emission engine.

In view of the fact that test data, shown hereinbefore, indicates that the non-barium containing catalysts may have higher initial activities and good stability for low temperature gas streams, it appears desirable, in a preferred embodiment, to utilize such form of catalyst in the upstream section of the unit to effect the initial contact of the exhaust gas stream. Thus, at least a partially oxidized and increased temperature stream is passed from the catalyst portion A to the catalyst portion B having the barium oxide incorporated therewith. Alloy screening or other perforate partitioning means 9 may be utilized between the catalyst portions A and B to effect a physical separation of the two different portions of the catalyst; however, a preferable means utilizes a difference in the size of the catalyst particles to effect an automatic physical separation. In other words, with a down-flow for the exhaust gas stream, the law emission catalyst may be provided in a size somewhat larger than the high emission catalyst such the latter automatically will tend to settle during operaion. In one instance, such as shown in the accompanying drawing, the low emission catalyst particles A can be made slightly larger than ⅛-inch average diameter and the high temperature resistant high emission catalyst particles, containing barium, will be slightly smaller than ⅛-inch average diameter such that under the normal jar of driving conditions there will cause the automatic physical separation of particles throughout the entire life of the converter. In a converter-muffler unit utilizing an upflow, or a radial flow, the relationship of the particles will, of course, be reversed or adjusted to provide that the barium containing particles are in the downstream portion to more readily accommodate the high temperature conditions.

It is not intended to limit the present invention to the use of any one particular form of converter or to any two particular forms of catalyst compositions. However, as set forth hereinbefore, at least one portion of the mixed catalyst bed shall contain an added component of an alkaline earth group metal oxide comprising calcium oxide, strontium oxide or barium oxide, and preferably barium in combination with an active oxidation catalyst component, such as platinum. The non-barium containing catalyst composite in the physical mixture may vary in its composition and in its method of preparation; however, here again, a preferred portion utilizes platinum as the active metal component. The platinum may or may not be added to the base material in the presence of an organic acid; although, as pointed out in connection with the results of the foregoing examples, utilization of a sulfur-containing carboxylic acid during the preparation of the catalyst appears to provide a highly active stable catalyst as long as the exhaust gas stream is carried out at relatively low temperature ranges, say below about 1400° F.

TABLE I

| Example No. | Type of catalyst | Hydrocarbon conversion | | | CO conversion | | |
|---|---|---|---|---|---|---|---|
| | | A | 32 hr | 62 hr. | A | 32 hr | 62 hr. |
| I | Al₂O₃+.32 Tr. oz. Pt. red. H₂ | 79.8 | ¹ 52.1 | | 94.7 | ¹ 73.8 | |
| II | Al₂O₃+.32 Tr. oz. Pt. red.+10% BaO | 54.5 | 41.0 | | 85.5 | 72.0 | |
| III | Al₂O₃+.32 Tr. oz. Pt. red. H₂+10% BaO. | 58.0 | 40.0 | | 90.0 | 71.0 | |
| IV | Al₂O₃+.32 Tr. oz. Pt.+3/1 TMA red | 73.0 | 63.0 | 54.0 | 95.0 | 85.0 | 76.0 |
| V | Al₂O₃+.32 Tr. oz. Pt.+3/1 TMA red. +10% BaO. | 68.0 | 53.0 | 38.0 | 96.0 | 77.0 | 60.0 |
| VI | Al₂O₃+.32 Tr. oz. Pt.+3/1 TMA red. H₂. | 59.0 | 55.5 | | 84.5 | 81.5 | |
| VII | Al₂O₃+.32 Tr. oz. Pt.+3/1 TMA red. +10% BaO. | 66.0 | 45.0 | | 98.0 | 68.0 | |
| VIII | Al₂O₃+.32 Tr. oz. Pt.+3/1 CA cal. 1800° F. | 59.9 | ¹ 32.8 | | 72.6 | ¹ 50.9 | |
| IX | Al₂O₃+.32 Tr. oz. Pt.+3/1 CA+10% BaO cal. 1800° F. | 65.7 | ¹ 61.6 | | 72.9 | ¹ 69.3 | |
| X | Al₂O₃+.32 Tr. oz. Pt.+3/1 CA+10% CaO cal. 1,800° F. | 62.2 | ¹ 47.4 | | 66.2 | ¹ 57.4 | |
| XI | Al₂O₃+.32 Tr. oz. Pt.+3/1 CA+10% StO cal. 1,800 °F. | 66.5 | ¹ 43.8 | | 72.9 | ¹ 59.5 | |

¹ 40 hour conversion.

I claim as my invention:

1. A converter-muffler apparatus for effecting the oxidation of engine exhaust gas stream at variable temperature ranges by reason of varying hydrocarbon emission rates, which comprises in combination, a converter chamber, an inlet port connecting with an inlet manifold section in said chamber, a spaced outlet manifold section within the chamber having a connecting outlet port, perforate partitioning means between said manifold sections, a first catalyst bed in said chamber adjacent the inlet manifold section disposed on one side of said partitioning means and consisting essentially of alumina particles containing from about 0.01% to about 1.0% of platinum as an activating component, and a second separate catalyst bed between the first mentioned bed and said outlet manifold section disposed on the other side of said partitioning means and comprising alumina particles containing from about 0.01% to about 1.0% of platinum and from about 1.0% to about 20% of an alkaline earth component selected from the group consisting of calcium, strontium and barium.

2. The apparatus of claim 1 further characterized in that the particles in the second bed have an average size slightly smaller than the particles in the first-mentioned bed.

3. The apparatus of claim 1 further characterized in that the alkaline earth component in the catalyst of said second bed is barium oxide.

4. The apparatus of claim 1 further characterized in that the catalyst of said second bed is a composite of alumina, platinum and barium which is prepared by impregnating said alumina with a solution of a platinum containing compound and from about 0.13% to about 0.70% by weight, based upon the weight of the alumina, of an organic acid selected from the group consisting of dibasic acids and derivatives thereof, having the following structural formula:

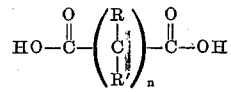

Where:
R is selected from hydrogen, hydroxyl and alkyl groups;
R' is selected from hydrogen, alkyl and carboxyl groups; and
n is within the range of 0 to 6, and subsequently impregnating the alumina-platinum composite with a solution of barium hydroxide providing from about 5% to 10% barium by weight thereof after rinsing and drying.

5. The apparatus of claim 4 still further characterized in that the organic acid comprises citric acid.

References Cited

UNITED STATES PATENTS

| | | | |
|---|---|---|---|
| 2,664,340 | 12/1953 | Houdry | 23—288 X |
| 3,086,839 | 4/1963 | Bloch | 23—288 X |
| 3,113,000 | 12/1963 | Gerhold | 23—288 |
| 3,259,589 | 7/1966 | Michalko | 252—466 |
| 3,291,564 | 12/1966 | Kearby | 23—2 |

FOREIGN PATENTS

| | | |
|---|---|---|
| 1,297,352 | 6/1962 | France. |
| 435,650 | 9/1935 | Great Britain. |

JOSEPH SCOVRONEK, Primary Examiner

U.S. Cl. X.R.

23—2; 252—430, 431, 466